Figures 1, 2, 7:
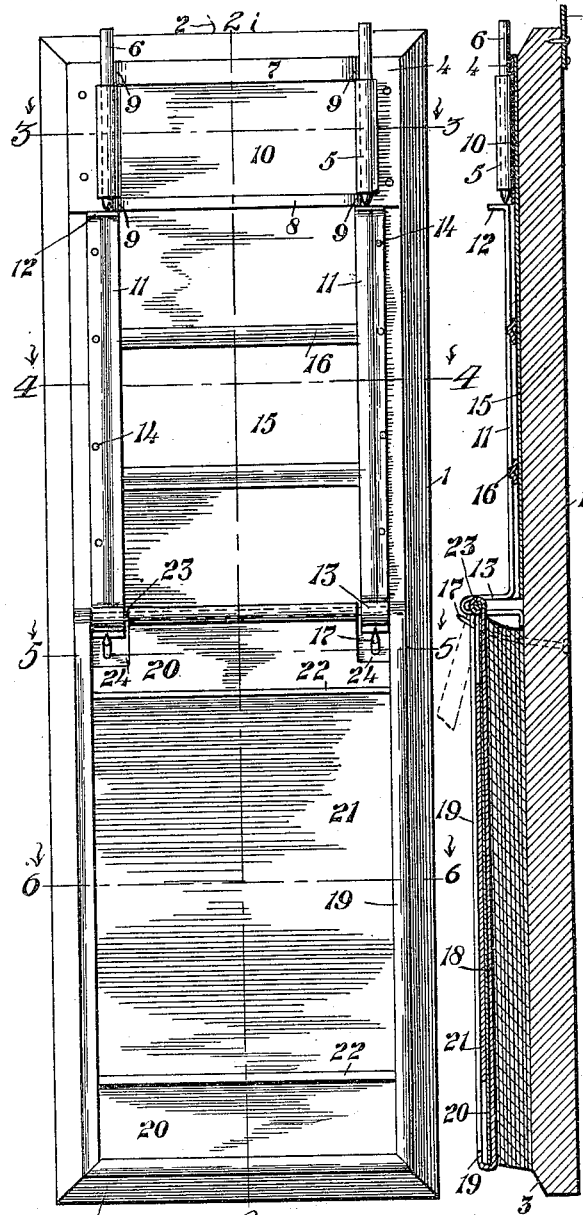

J. H. RINGER.
CREDIT SLIP HOLDING MEMORANDUM DEVICE.
APPLICATION FILED SEPT. 16, 1912.

1,069,474.

Patented Aug. 5, 1913.

Witnesses
Philip A. H. Terrell
Hazel Owen

Inventor
John H. Ringer

By
Boyd & Miller
Attorneys

UNITED STATES PATENT OFFICE.

JOHN H. RINGER, OF CANTON, OHIO, ASSIGNOR OF ONE-HALF TO PERRY E. RUSSELL, OF CANTON, OHIO.

CREDIT-SLIP-HOLDING MEMORANDUM DEVICE.

1,069,474. Specification of Letters Patent. Patented Aug. 5, 1913.

Application filed September 16, 1912. Serial No. 720,491.

*To all whom it may concern:*

Be it known that I, JOHN H. RINGER, a citizen of the United States, residing at Canton, in the county of Stark and State of Ohio, have invented a new and useful Credit-Slip-Holding Memorandum Device, of which the following is a specification.

My invention relates to improvements in credit-slip-holding memorandum devices.
Many modern retail dealers, such as grocers, now employ what may be called the credit register bookkeeping method involving the use of duplicate slips or bills for the goods delivered to their customers, each of such bills or slips, commonly called "credit slips" indicating the total balance due carried forward from previous slips, the amount of the order accompanying the slip in question, and the total amount of the previous balance and the amount of said slip, so that the customer receives not only a bill of the goods included in that particular delivery, but also a statement of the total amount due the dealer. When settlements with the dealer are made from time to time it is advisable for the customer to audit all of his credit slips and thus it becomes necessary to carefully keep the credit slips as they are received upon a proper file, and preferably in the order in which they are received to facilitate the auditing thereof. The customer in such cases is usually the housekeeper, as such credit slip systems are more practically adapted for dealers in household provisions and the like.

It is important to the dealer that the customer should keep and audit the credit slips and that such audit should show that the balance indicated as due is exactly correct. The loss of slips by the customer, preventing audit thereof makes it necessary for him to rely entirely upon the duplicate slips in the hands of the dealer and this gives rise to frequent misunderstandings injurious to trade. By far the greater number of orders are telephoned to the dealers in provisions and the like and in fact the customer in many instances seldom meets the dealer or sees the interior of his place of business.
The orderly, modern housekeeper throughout the day notes upon a list in some manner the various supplies needed and on the following morning telephones the order to the dealer. Frequently there are a number of dealers, any one of whom is capable of filling the order in a satisfactory manner, and thus as a matter of competition and trade success the thoughful dealer provides all of the means possible to suggest to the customer the propriety and convenience of telephoning the order to him.

The object of the present invention is to provide the housewife with a means for conveniently listing the supplies which it is desired to order, at the same time suggesting the store of a particular dealer to whom the order may be given, and providing a convenient means for the filing of the credit slips as received with the supplies delivered by said dealer. The device thus not only serves as an ever-present salesman or representative of the dealer, and suggests the store of the dealer in question at the psychological moment to secure the order for that particular dealer, but also provides means for conveniently keeping a file of the credit slips received in the order of their receipt so that the customer may at any time satisfy himself as to the exact condition of his account. This object, together with other objects apparent to those skilled in the art, may be attained by the construction illustrated in the accompanying drawings, although the invention may be embodied in other forms, the construction illustrated being chosen by way of example.

In the drawings Figure 1 is a front elevation of a credit-slip-holding memorandum device made in accordance with my invention. Fig. 2 is a vertical sectional view on the line 2—2 of Fig. 1. Figs. 3, 4, 5 and 6 are transverse sectional views on the lines 3—3, 4—4, 5—5 and 6—6 respectively of Fig. 1. Fig. 7 is a rear fragmentary elevation of the back of the device showing the hanging ring.

Throughout the several views similar reference numerals indicate similar parts.

More specifically describing the construction illustrated in the drawings, the numeral 1 indicates a base, preferably of wood which may be provided with means, as the ring 2 for hanging the device upon a nail or other support. On the front side the base 1 is preferably provided with champered edges 3. At the upper end of the base the pencil-holder and name-plate frame member 4 is provided which is preferably formed of thin sheet metal of rectangular outline in the blank and having the body portion thereof cut partly free and curled outwardly and back upon itself, producing the two pencil rolls 5 for the purpose of holding the pencils 6. The body portion of the member 4 being thus rolled to the side leaves the upper and lower frame strips 7 and 8 respectively, which are bent outwardly at the points 9 in order to space said strips from the front face of the base for the purpose of permitting a name-plate card 10 to be slidably inserted between said base and said strips, as shown in Fig. 3.

Below each pencil roll is a vertically arranged card holding strip 11, the upper end of which is bent outwardly producing the pencil stop 12 against which the end of the pencil is adapted to rest when in the roll 5. Each strip 11 thence extends downwardly for a considerable portion of the length of the base 1, and at its lower end is bent forwardly, thence downwardly and rearwardly, producing the hinged loop 13. The strips 11 are preferably connected to the base 1 by means of the small brads 14 arranged in the outer edge of each strip, and the body portion of each strip is so formed that its inner edge will be spaced from the base 1, producing the cross sectional shape, shown clearly in Fig. 4, for the purpose of permitting the card 15 to be slidably entered between and underneath the inner edges of said strips. It is intended that the card 10 should bear the name and address of the dealer or grocer who furnishes these devices to his customers, while the card 15 may bear other advertising matter, if desired, or both the cards 10 and 15 may bear a single advertisement. If the card 15 bears a number of different advertisements and it be desired to separate the same in a neat manner from each other the division strips 16, preferably of the cross sectional shape illustrated in Fig. 2, may be arranged on top of the card 15 having their ends preferably flattened and extended under the inner edges of the card holding strips 11.

Connected to the base 1 and extending forwardly and preferably curved upwardly closely adjacent the loops 13 are the credit slip holding pins 17 which may be formed of a sharpened brad or nail driven through the base 1, as shown in the drawings, and curved or bent upwardly at its pointed end. The credit slip cover and memorandum slate is hinged to the loops 13 and is adapted to normally hang downwardly in front of the credit slips for the purpose of holding said slips in place upon the pins 17 and for the purpose of protecting said slips from the view of the curious. Said cover is formed of a back 18 of sheet metal provided with frontwardly and downwardly turned edge flanges 19, which flanges hold in place a card 20 in front of which is arranged a memorandum tablet 21. Said tablet is preferably formed of a slate-finished card adapted to be written upon by a slate pencil and having at its top and bottom edges a binding or finished edge piece 22 of thin sheet metal. The tablet 21 is preferably shorter than the card 20, thus providing space both above and below the tablet for advertisement if desired. Along the upper edge of the back 18 the hinge-wire 23 is rolled into the edge of said back and the back as well as the card 20 is cut away at two places 24, thus baring the wire 23 where it passes through the loop 13 and also permitting the points of the pins 17 to extend beyond the hinged cover.

It will be understood that when there are but few credit slips upon the pins 17 the hinged cover will have a tendency to lie close to said slips, the wire 23 remaining in the rear portion of the loops 13, but as the number of slips on the pins 17 increases, as shown in Fig. 2, the wire 23 will gradually move forward in the loops 13 until the extreme forward limit of such movement is reached. In order to place a credit slip upon the pins 17 it is necessary to move the cover forwardly upon its hinged connection as indicated by the fragmentary dotted lines in Fig. 2, it being necessary however to move the cover upwardly much farther than indicated in said dotted lines in order to clear the points of the pins 17. When the credit slip has been placed upon said pins and the cover is allowed to fall back into the position shown in full lines in Figs. 1 and 2, the said cover will move the slip back against the previous filed slips, thus keeping all of said slips in neat order.

In using the device the customer, from time to time, as the needs of the household are suggested takes one of the pencils 6 and writes the various items upon the tablet 21. When about to telephone the order to the dealer the customer then either takes the device to the telephone so as to read off the list so made or at least consults said list and thus at the very time of consulting said list the name and address, or telephone number of the dealer whose card is displayed by the device is brought to the attention of the customer, thus naturally directing the order to said dealer's establishment. When the supplies have been received the credit slip accompanying the same may be compared with the list on the tablet 21 before the list is filed and the list may be readily erased from the tablet, whereupon a new list may be started.

Attention should be called to the fact that the various spaces upon the cards displayed by the device may, if desired, be occupied by advertisements of well-known brands of goods to be purchased at the store of the dealer whose card is displayed.

I claim:—

A credit-slip-holding memorandum device comprising means for displaying a dealer's business card, means for erasibly noting supplies required and means for holding credit slips of said dealer, said business card being displayed with said notation of supplies and said means for noting supplies normally concealing said credit slips.

In testimony that I claim the above, I have hereunto subscribed my name in the presence of two witnesses.

JOHN H. RINGER.

Witnesses:
 JOHN H. BISHOP,
 WILLIAM H. MILLER.